US008307300B1

(12) United States Patent
Fisher et al.

(10) Patent No.: US 8,307,300 B1
(45) Date of Patent: Nov. 6, 2012

(54) CONTENT RESIZING AND CACHING IN MULTI-PROCESS BROWSER ARCHITECTURE

(75) Inventors: Darin Fisher, San Jose, CA (US); Brett Wilson, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 902 days.

(21) Appl. No.: 12/201,772

(22) Filed: Aug. 29, 2008

Related U.S. Application Data

(60) Provisional application No. 61/052,719, filed on May 13, 2008.

(51) Int. Cl.
*G06F 3/048* (2006.01)

(52) U.S. Cl. ........ 715/800; 345/531; 345/534; 715/781; 715/788

(58) Field of Classification Search .................. 715/234, 715/235, 236, 238, 243, 244, 252, 777, 781, 715/788, 798, 800, 866; 345/530–535, 545–551, 345/553, 556, 557, 570, 686; 711/167–169
See application file for complete search history.

(56) References Cited

U.S. PATENT DOCUMENTS

| | | | | |
|---|---|---|---|---|
| 5,764,235 A * | 6/1998 | Hunt et al. | ..................... | 345/428 |
| 5,819,263 A | 10/1998 | Bromley et al. | | |
| 6,011,537 A * | 1/2000 | Slotznick | ....................... | 715/733 |
| 6,456,305 B1 * | 9/2002 | Qureshi et al. | ................. | 715/800 |
| 6,657,647 B1 * | 12/2003 | Bright | ............................. | 715/856 |
| 6,742,043 B1 * | 5/2004 | Moussa et al. | ................. | 709/232 |
| 7,257,776 B2 * | 8/2007 | Bailey et al. | ................... | 715/788 |
| 7,343,419 B1 * | 3/2008 | Robinson | ....................... | 709/231 |
| 7,376,907 B2 * | 5/2008 | Santoro et al. | ................. | 715/765 |
| 7,584,249 B2 * | 9/2009 | Mumick et al. | ............... | 709/205 |
| 7,703,013 B1 * | 4/2010 | Bauermeister et al. | ........ | 715/255 |
| 7,822,806 B2 * | 10/2010 | Frank et al. | .................... | 709/203 |
| 7,937,654 B1 * | 5/2011 | Ayers et al. | .................... | 715/252 |
| 2003/0028591 A1 * | 2/2003 | Goloshubin et al. | ........... | 709/203 |
| 2003/0069927 A1 * | 4/2003 | Malrnskog | ..................... | 709/203 |
| 2003/0221068 A1 | 11/2003 | Tsuji et al. | | |
| 2004/0128342 A1 * | 7/2004 | Maes et al. | ..................... | 709/200 |
| 2004/0152062 A1 * | 8/2004 | Adams | .......................... | 434/336 |

(Continued)

OTHER PUBLICATIONS

"The WebKit Open Source Project", downloaded from "www.webkit.org" on Jul. 2, 2008, 1 page.

(Continued)

*Primary Examiner* — Weilun Lo
*Assistant Examiner* — Enrique Iturralde
(74) *Attorney, Agent, or Firm* — Sterne, Kessler, Goldstein & Fox P.L.L.C.

(57) ABSTRACT

The present invention relates to systems and methods for content resizing and caching in multi-process browser architecture. An embodiment includes initiating a rendering engine process and a browser process, receiving a request to resize content, providing the request to the rendering engine process, waiting to allow the rendering engine process to render an updated bitmap associated with the content and displaying the updated bitmap synchronously if the updated bitmap is produced during the waiting step. Another embodiment includes, receiving an input associated with the status of a tab, determining if the tab is a background tab or a foreground tab based on the receiving step, checking a cache for a bitmap of content associated with the tab if the tab has changed status to a foreground tab; and displaying the contents of the cache in the tab if the cache includes the bitmap of content previously associated with the tab.

21 Claims, 5 Drawing Sheets

U.S. PATENT DOCUMENTS

| | | | |
|---|---|---|---|
| 2004/0158830 A1* | 8/2004 | Chung et al. | 718/1 |
| 2004/0177327 A1* | 9/2004 | Kieffer | 715/901 |
| 2005/0116966 A1* | 6/2005 | Graham et al. | 345/661 |
| 2005/0149852 A1 | 7/2005 | Bleicher et al. | |
| 2005/0157948 A1* | 7/2005 | Lee | 382/299 |
| 2005/0172009 A1* | 8/2005 | Roh et al. | 709/219 |
| 2005/0204292 A1 | 9/2005 | Kibilov et al. | |
| 2006/0031760 A1* | 2/2006 | Jacobs | 715/517 |
| 2006/0080292 A1 | 4/2006 | Alanzi | |
| 2006/0184875 A1* | 8/2006 | Okada et al. | 715/516 |
| 2006/0230356 A1 | 10/2006 | Sauve et al. | |
| 2007/0028184 A1 | 2/2007 | Jang | |
| 2007/0067733 A1 | 3/2007 | Moore et al. | |
| 2007/0101258 A1* | 5/2007 | Xu et al. | 715/516 |
| 2007/0283247 A1* | 12/2007 | Brenneman et al. | 715/513 |
| 2007/0294333 A1 | 12/2007 | Yang et al. | |
| 2008/0065237 A1 | 3/2008 | Long | |
| 2008/0091775 A1* | 4/2008 | Wang et al. | 709/203 |
| 2008/0177994 A1* | 7/2008 | Mayer | 713/2 |
| 2009/0070666 A1* | 3/2009 | Eilers et al. | 715/240 |
| 2009/0119611 A1 | 5/2009 | Hudson Jr. | |
| 2009/0132949 A1 | 5/2009 | Bosarge | |
| 2009/0287824 A1* | 11/2009 | Fisher et al. | 709/226 |
| 2009/0300656 A1* | 12/2009 | Bosworth et al. | 719/320 |
| 2009/0307603 A1* | 12/2009 | Gowda et al. | 715/749 |
| 2010/0066668 A1 | 3/2010 | Wong et al. | |
| 2010/0153544 A1* | 6/2010 | Krassner et al. | 709/224 |
| 2010/0153836 A1* | 6/2010 | Krassner et al. | 715/234 |
| 2010/0169772 A1 | 7/2010 | Stallings et al. | |
| 2010/0218122 A1* | 8/2010 | Robarge et al. | 715/760 |
| 2010/0312858 A1 | 12/2010 | Mickens et al. | |
| 2011/0015917 A1* | 1/2011 | Wang et al. | 703/23 |

OTHER PUBLICATIONS

U.S. Appl. No. 13/248,718, to Fisher et al., "Content Resizing and Caching in Multi-Process Browser Architecture," filed Sep. 29, 2011.

* cited by examiner

CONTENT RESIZING AND CACHING IN MULTI-PROCESS BROWSER ARCHITECTURE

CROSS REFERENCE TO RELATED APPLICATIONS

This patent application claims the benefit of U.S. Provisional Patent Application No. 61/052,719, filed May 13, 2008, entitled "Multi-Process Browser Architecture," which is incorporated herein by reference in its entirety.

BACKGROUND

1. Field of the Invention

The present invention relates to browser technology.

2. Background Art

Browsers are used to access web content or locally stored content. The location of such content is often identified by a location address such as a uniform resource locator (URL). A browser may use a URL to access content associated with the URL. A user can interact with a browser through a user interface to direct a browser to different content areas.

Content areas may contain text, audio, video and other forms of content delivery. Content requested by a user through a browser needs to be rendered for display so that the user can view the content using a display device such as a monitor.

Content delivered across networks such as the Internet has become increasingly rich in information and interactivity. To interact with such content, users are usually provided with various types of interfaces ranging from touch-screen interfaces to voice driven interfaces in addition to standard windowed interfaces.

User interfaces which allow interaction with content are usually most effective when they are more responsive. For example, consider a touch screen interface which allows a user to interact with a map through a browser. If in this case, the map is not rendered for display as fast as the touch screen perceives a user's touch driven gesture, it results in a poor user experience. Similarly, there are other forms of user interfaces, which are effective only if data is rendered for display at a rate that matches or is close to the rate of the user's interaction. Furthermore, older forms of user interface techniques or standard user windowed interfaces will be considerably more effective if rendering of data represented by them is improved.

In some cases, a user interface of a browser may become unresponsive due to improper rendering of content for display. A browser's user interface may also become unresponsive if it is waiting for content to be rendered for display. Furthermore, in the case of a tab view browser, content may not be rendered as soon as a user switches between tabs or when a user resizes content within a tab or a window. Delays in rendering of content may lead to undesirable effects such as flicker. Flicker, a flashing effect displeasing to the eye, often results from change in the state of displayed content, which is in most cases a rapid transition. Part or all of a flickering content area is frequently and completely blank or in some other intermediate state, leading to a poor user experience.

BRIEF SUMMARY

The present invention relates to systems and methods for content resizing and caching in a multi-process browser architecture.

A system embodiment includes a rendering engine process that generates a rendered image of a certain size on request, a browser process that synchronously displays the updated bitmap, and a timer to check if the rendering engine has produced the bitmap in a pre-determined amount of time. A method embodiment includes initiating a rendering engine process and a browser process, receiving a request to resize content, providing the request to the rendering engine process, waiting to allow the rendering engine process to render an updated bitmap associated with the content, and displaying the updated bitmap synchronously if the updated bitmap is produced during the waiting step.

Another method embodiment includes receiving an input associated with the status of a tab, determining if the tab is a background tab or a foreground tab based on the receiving step, checking a cache for a bitmap of content associated with the tab if the tab has changed status to a foreground tab and displaying the contents of the cache in the tab if the cache includes the bitmap of content previously associated with the tab.

In this way, content may be displayed synchronously by a browser to reduce flicker that may be produced during resizing of content or switching of tabs.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The present invention relates to systems and methods for content resizing and caching in multi-process browser architecture. An embodiment includes initiating a rendering engine process and a browser process, receiving a request to resize content, providing the request to the rendering engine process, waiting to allow the rendering engine process to render an updated bitmap associated with the content and displaying the updated bitmap synchronously if the updated bitmap is produced during the waiting step.

In this way, content may be displayed synchronously by a browser to reduce flicker that may be produced during resizing of content or switching of tabs.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "content area" used herein refers to an area of a user interface display that can display content addressed by an address or identifier, such as, a URL or a file name. As an illustrative example, the content displayed in the content area may include, for example, a web page, application, document, video, multimedia content, future utilized content mechanism, or any combination thereof. These examples are illustrative and are not intended to limit the definition.

The term "bitmap" used herein refers to a rendered content area that can be displayed. As an example, a bitmap may be a group of one or more pixels representing content. This example is illustrative and is not intended to limit the definition.

The term "tab" used herein refers to a content area in a tab view user interface. As an example, some web browsers provide a tabbed interface. The FIREFOX 2 browser is an example of a browser with a tabbed interface. In a tabbed interface, content areas may be displayed in different tabs. If a user selects a tab, a page associated with the tab is displayed. Each browser window can contain many tabs, allowing the user to open many pages inside a single window. These examples are illustrative and are not intended to limit the definition.

The detailed description of the embodiments of the present invention is divided into several sections as shown by the following table of contents.

Table Of Contents
1. System
2. Content Caching During Switching Of Tabs
3. Updating Content In Background Tabs
4. Rendering of Resized Content
1. System This section describes a system according to an embodiment of this invention with respect to FIGS. 1A-1B.

Figure 1A:
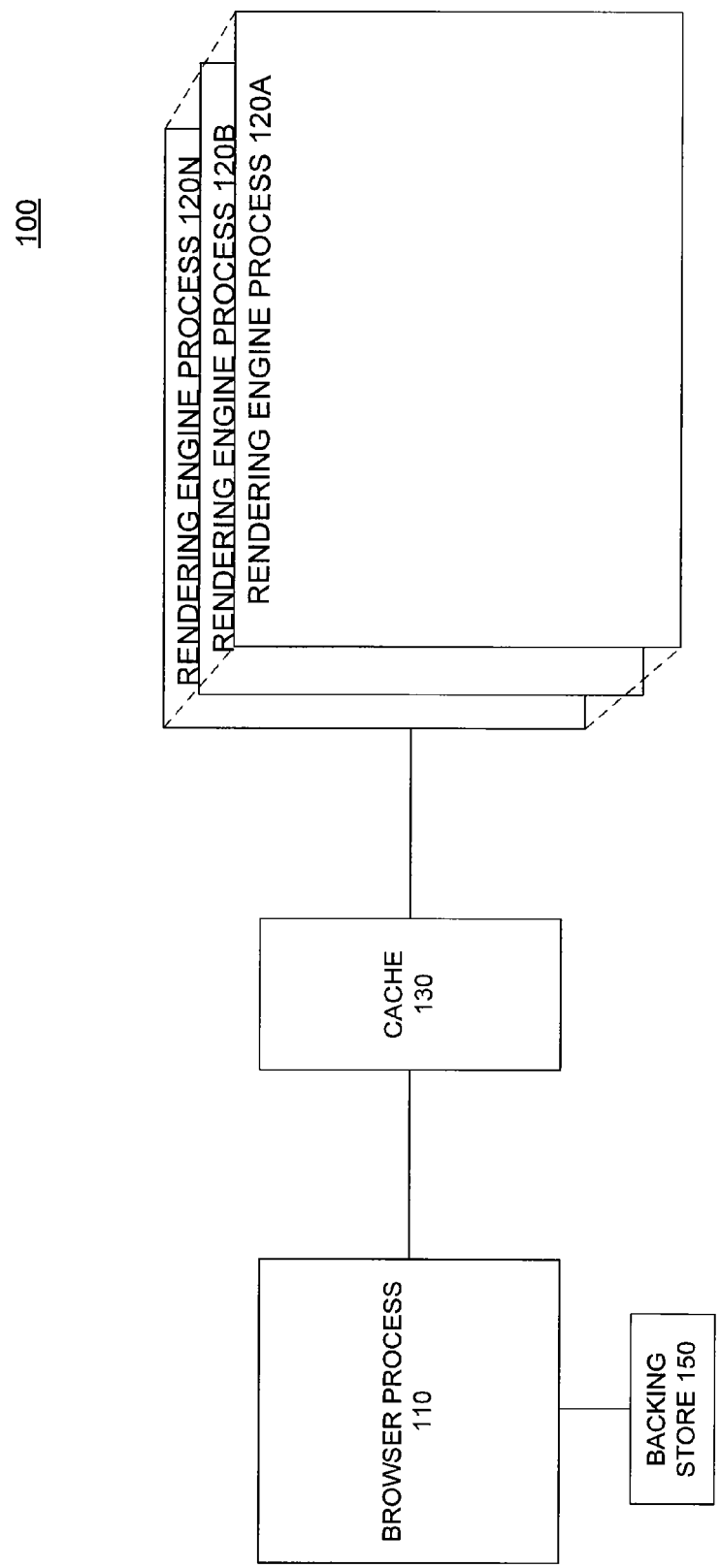
FIG. 1A is a diagram of a system for rendering in a browser according to an embodiment of the invention.

FIG. 1A is a diagram of system 100 according to an embodiment of this invention. In one example, system 100 is implemented as a browser.

System 100 may be implemented on any device that can support browsing. Such a device may include, but is not limited to, a device having a processor and memory for executing and storing instructions. Such a device may include software, firmware, and/or hardware. Software may include one or more applications and an operating system. Hardware can include, but is not limited to, a processor, memory, and user interface display. Optional input devices, such as a keyboard, a mouse, a touch sensitive screen, joystick, or other interface device may be used.

System 100 may contact a remote server (not shown) and download data to display. In an example, the data may be represented as hypertext markup language, dynamic hypertext markup language, extendable markup language, text, numeric data, or file data. The data can represent text, images, video, audio or other content. In another example, system 100 may download and execute scripts according to the AJAX (Asynchronous JavaScript and XML) framework. The AJAX framework may asynchronously transmit and receive data from a server to system 100 update a content area without reloading the content area.

System 100 includes a browser process 110 coupled to one or a plurality of rendering engine processes 120A-N through cache 130. Browser process 110 can communicate with one or more web servers (not shown) over one or more networks, such as the Internet. Browser process 110 can further communicate with an input (not shown) to allow a user to input data, to input commands, or to provide other control information to browser process 110. Rendering engine process(es) 120A-N can render data for display at a client device running browser process 110. In an embodiment, browser process 110 and rendering engine process(es) 120A-N are instantiated as separate processes in a multi-process browser architecture, an example of which is described in U.S. Provisional Patent Application No. 61/052,719, filed May 13, 2008, entitled "Multi-Process Browser Architecture," which is incorporated herein by reference in its entirety. In another embodiment, rendering engine process(es) may be instantiated in separate thread(s). In still another embodiment, rendering engine process(es) 120A-N may be instantiated on separate computing environments, for example, remote servers or clients.

Browser process 110 and rendering engine process(es) 120A-N may communicate through cache 130. Cache 130 may be any form of volatile or non-volatile memory that can be used to store data. Cache 130 may be used to store a bitmap associated with content.

Browser process 110 may communicate with backing store 150. Backing store 150 may be a form of a device dependent bitmap. A device dependent bitmap (DDB) may be a form of image data that is stored in a format specific to a display device. In an embodiment, browser process 110 may update backing store 150 with a bitmap that it may retrieve from cache 130. Additionally, one or more backing store(s) 150 may be inserted and stored in cache 130 by browser process 110. Cache 130 may store a plurality of backing stores, for example "N" backing store(s) 150. When a backing store is being inserted into cache 130, a least recently used backing store stored in cache 130 may be evicted by cache 130 to accommodate the backing store being inserted. A least recently used backing store, for example, may be a backing store that has not been retrieved, updated, modified or manipulated in any way by cache 130 or browser process 110. In this way, for example, a least recently used (LRU) eviction policy may be used by cache 130. This example is purely illustrative and is not intended to limit the invention. It is to be appreciated that other cache models and eviction policies may be used that may take into account a size (e.g. number of bytes) or other parameters of backing store(s) 150.

Figure 1B:
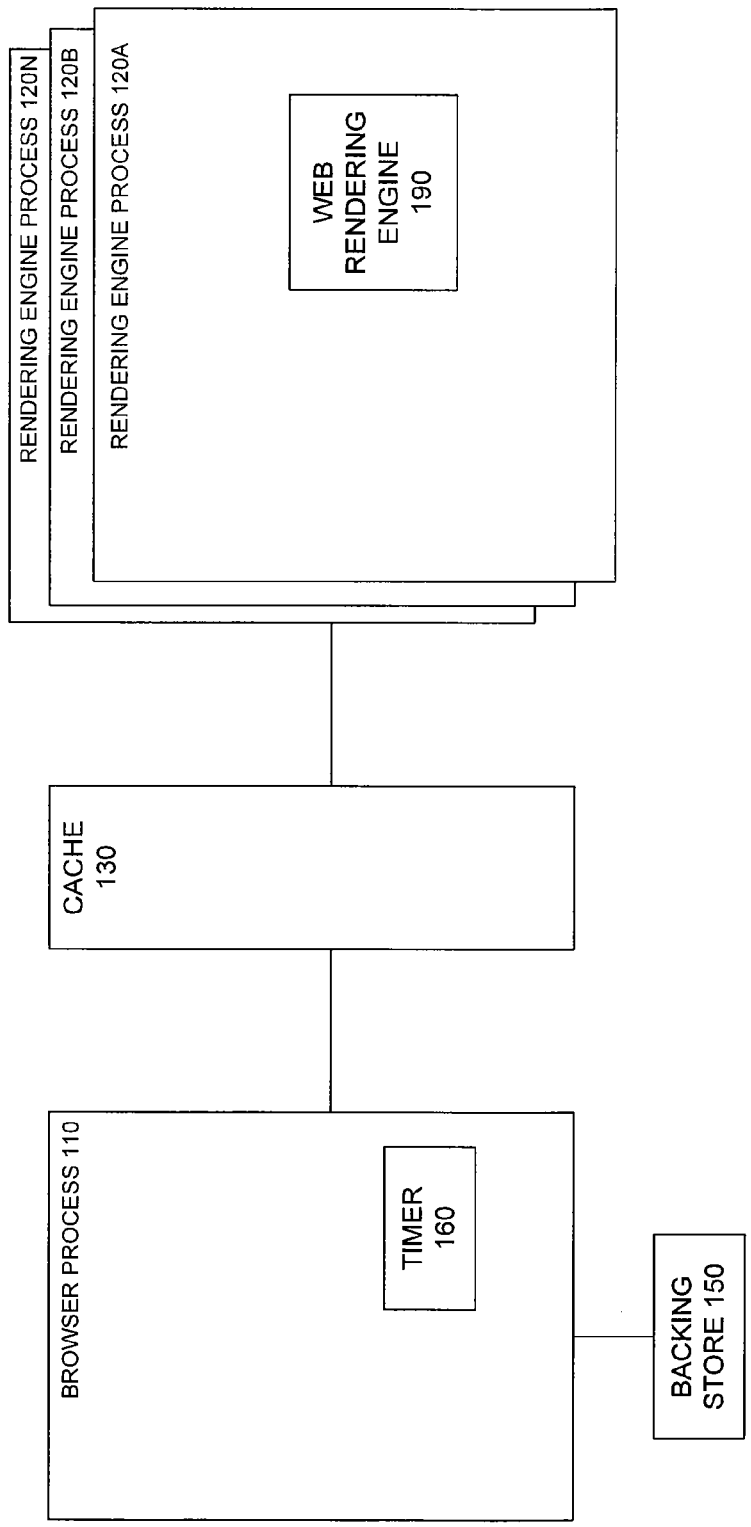
FIG. 1B is a diagram illustrating the system of FIG. 1A in further detail.

FIG. 1B is a diagram illustrating the components of system 100 in further detail.

As shown in FIG. 1B, browser process 110 may further include timer 160. Timer 160 may be any form of an up-counter or a down-counter that may be used to check if rendering engine process(es) 120A-N has produced an updated bitmap in a predetermined amount of time.

Rendering engine process 120A-N may further include web rendering engine 190. In an embodiment, web rendering engine 190 may process scripts that may be included as a part of content retrieved by browser process 110. In an example, not intended to limit the invention, web rendering engine 190 may process JAVASCRIPT that may be a part of content retrieved by browser process 110. In another example web rendering engine 190 may be the WEBKIT, an open source web rendering engine. Rendering engine process 120A-N, in an embodiment, may receive one or more events from web rendering engine 190. Such events may be based on user input that may be received by browser process 110. For example, user inputs may include requests to scroll or resize content received by browser process 110. Rendering engine process 120A-N may also receive messages from the browser process 110. Messages may include notification of the resizing of windows and also whether a certain tab is a background tab or a foreground tab.

The operation of system 100 during the switching of tabs in a tab view browser is described in the next section.

2. Content Caching During Switching of Tabs

This section describes the operation of system 100 during the switching of tabs. As described earlier, in a tab view browser, a tab may be a foreground tab or a background tab.

A foreground tab is a tab whose content is currently visible to a user and a background tab is a tab whose content is not visible by a user. When a user selects a background tab, the background tab transitions to a foreground tab and content that the user is currently viewing is replaced by the content of the tab that the user has selected to be a foreground tab.

Figure 2:
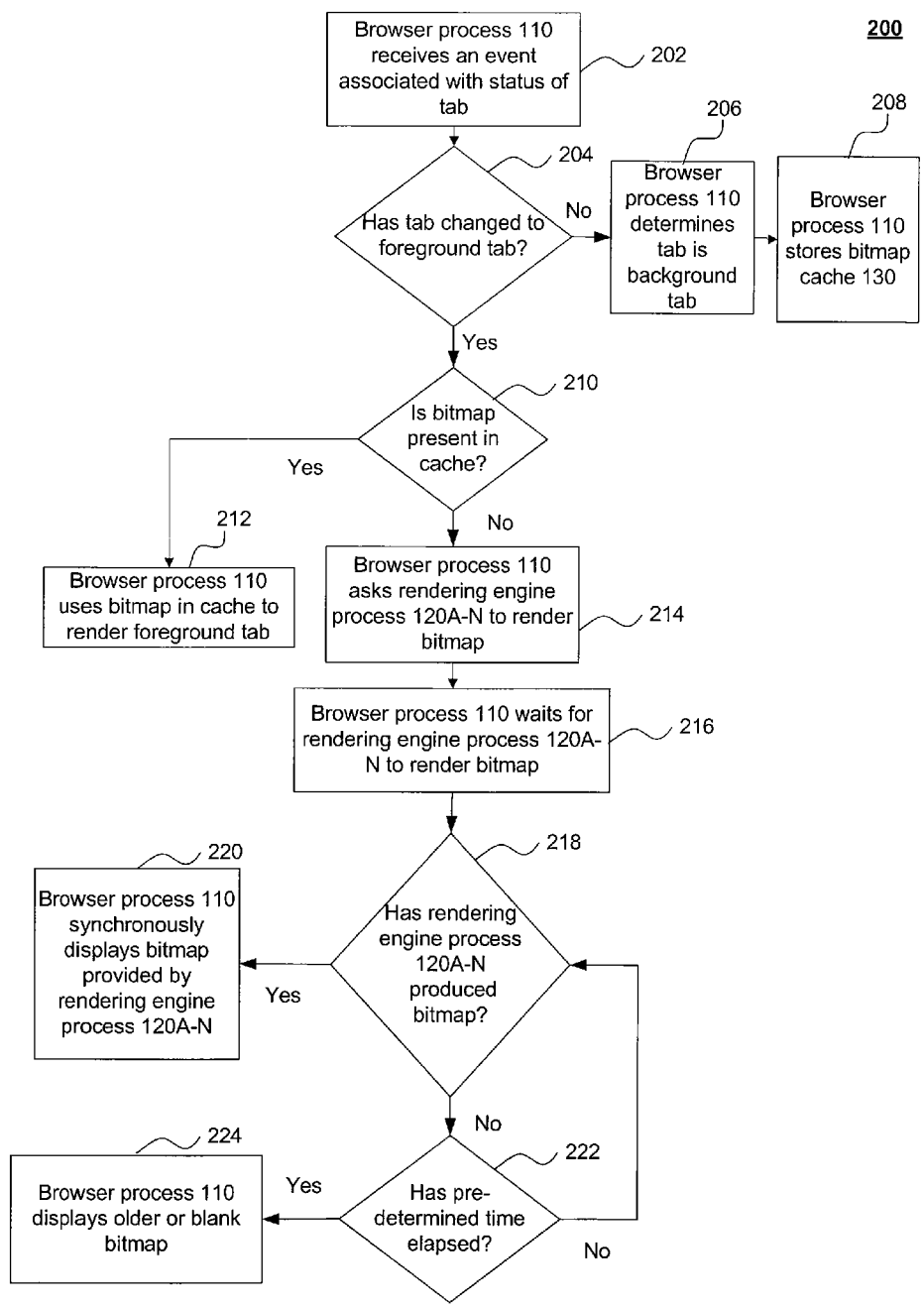
FIG. 2 is a flowchart illustrating retrieval of a bitmap from a cache, according to an embodiment of the invention.

FIG. 2 is a flowchart illustrating an exemplary process that may be used to render content depending on whether a tab is background tab or a foreground tab.

Method 200 begins with browser process 110 receiving an event associated with the status of a tab (step 202). As an example, an event associated with a status of a tab may indicate if the tab is a background tab or a foreground tab. An event associated with the status of a tab may be generated, for example, by rendering engine process(es) 120A-N in response to selection of a tab by a user.

Browser process 110 then determines if the tab has changed to a foreground tab depending on the event received in step 202 (step 204). If the tab has not changed to a foreground tab (step 204), browser process 110 determines that the tab is a background tab (step 206) and browser process 110 stores the bitmap associated with the content of the tab in cache 130 (step 208). As an example, the bitmap may be backing store 150. As described earlier, cache 130 may store a plurality of backing stores, for example "N" backing store(s) 150. When a backing store is being inserted in cache 130, a least recently used backing store stored in cache 130 may be evicted by cache 130 to accommodate the backing store that is being inserted. In this way, for example, a least recently used (LRU) eviction policy may be used by cache 130. This example is purely illustrative and is not intended to limit the invention. It is to be appreciated that other cache models and eviction policies may be used that may take into account a size (e.g. number of bytes) or other parameters of backing store(s) 150.

If the tab has changed to a foreground tab (step 204), browser process 110 checks cache 130 for a bitmap associated with the content of the tab that has changed to a foreground tab (step 210).

If a bitmap associated with the content of the tab that has changed to a foreground tab is present in cache 130 (step 210), browser process 110 uses the bitmap in cache 130 to render content associated with the foreground tab (step 212). Since the browser process uses a bitmap in cache 130, browser process 110 may not need to request rendering engine process 120A-N to render another bitmap. Thus use of a previously rendered bitmap stored in cache 130 may reduce the work done by rendering engine process 120A-N.

If the bitmap is not present in cache 130 (step 210), browser process 110 asks rendering engine process 120A-N to render a bitmap for the tab that has transitioned to a foreground tab (step 214).

Browser process 110 then waits for a pre-determined amount of time for rendering engine 120A-N to produce a bitmap (step 216).

Browser process 110 then checks if rendering engine process 120A-N has produced a bitmap (step 218). If the rendering engine process has produced a bitmap (step 218), browser process 110 displays the bitmap produced by rendering engine process 120A-N synchronously with respect to every request to render content for tabs that transition (from background to foreground states) from browser process 110 (step 220). Synchronous display of a bitmap is achieved when browser process 110 is able to display a bitmap produced by rendering engine process 120A-N in the predetermined amount of time.

If the rendering engine process has not produced a bitmap (step 218), browser process 110 checks if the pre-determined time has elapsed (step 222). If the pre-determined time has not elapsed (step 222), method 200 proceeds to step 218, where browser process 110 continues to wait for the rendering engine process 120A-N to produce an updated bitmap until the pre-determined time has elapsed.

If the pre-determined time has elapsed (step 222), browser process 110 may display an older bitmap or a blank bitmap (step 224). Furthermore, if rendering engine process 120A-N produces an updated bitmap even after the pre-determined time has elapsed, the updated bitmap can be displayed asynchronously by browser process 110 to allow a user to view updated content in a foreground tab.

As browser process 110 waits for a pre-determined amount of time for rendering engine process 120A-N to produce a bitmap, browser process 110 is able to synchronously display updated content to a user when the user switches from a background tab to a foreground tab. If browser process 110 did not wait for a pre-determined amount of time and displayed an older bitmap asynchronously, prior to displaying an updated bitmap, a user would initially see older content before is replaced by any updated or resized content, leading to undesirable effects such as flicker. In this way, synchronous display of resized content may reduce flicker and improve user experience.

In this way, browser process 110 may display content rendered by rendering engine process 120A-N depending on whether the tab is a background tab or a foreground tab. Since rendered content associated with a tab is displayed synchronously if the content is rendered by the rendering engine process 120A-N in a pre-determined amount of time, a user may be able to view display content without being affected by undesirable effects such as flicker. This can improve user experience.

3. Updating Content in Background Tabs

When a user selects a tab, the tab transitions from a background tab to a foreground tab. When the tab was initially a background tab, content associated with the tab may have been updated although the tab was a background tab. For example, certain images in the content may be modified or updated. In an embodiment, web rendering engine 190 may detect and record changes to content even when a tab is a background tab. When a tab transitions from being a background tab to a foreground tab, rendering engine process 120A-N checks for events that may have been received from web rendering engine 190 when the tab was a background tab. If events generated by web rendering engine 190 were received by rendering engine process 120A-N when a tab was a background tab, content associated with the tab is updated based on the events received. In this way, updated content may be displayed by a tab when it transitions from a background tab to a foreground tab.

Figure 3:
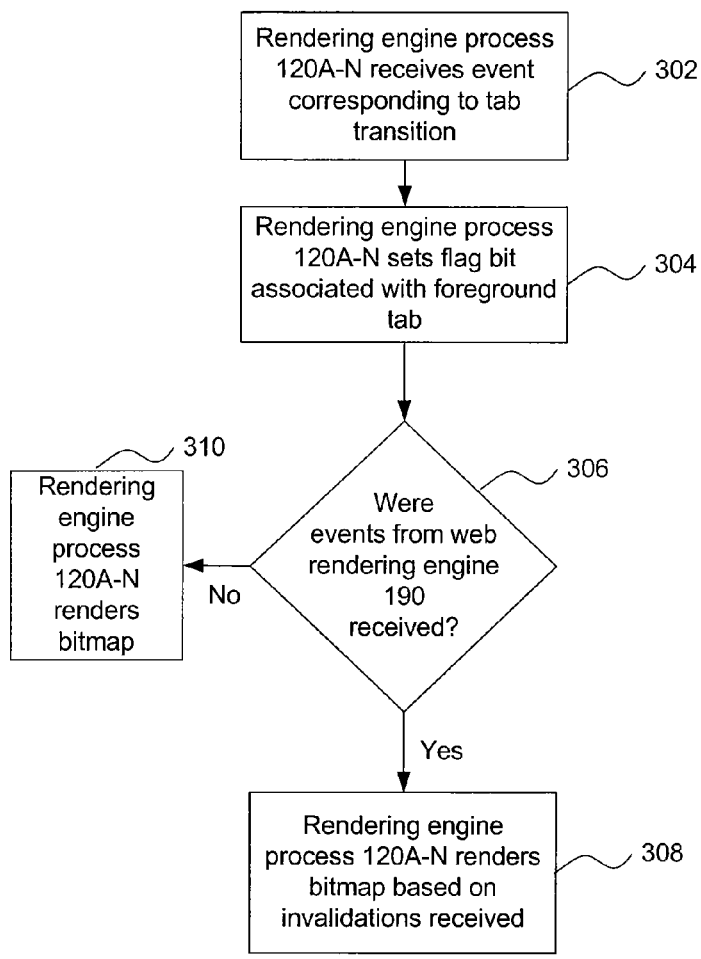
FIG. 3 is a flowchart illustrating rendering of a bitmap based on invalidations received from a web rendering engine, according to an embodiment of the invention.

FIG. 3 is a flowchart illustrating rendering of content based on events received from web rendering engine 190.

Method 300 begins with rendering engine process 120A-N receiving an event that informs rendering engine process 120A-N that a tab has transitioned to a foreground tab (step 302). As an example, rendering engine process 110 may receive an event from browser process 110, that a tab has transitioned to being a foreground tab from a background tab. A tab may transition to being a foreground tab from a background tab when a user, for example, selects a background tab.

Rendering engine process 120A-N may then set a flag bit associated with the foreground tab (step 304). As an example, such a flag bit may identify that the tab is now a foreground tab.

Rendering engine process 120A-N may then check for any events received from web rendering engine 190 while the tab was a background tab (step 306). As an example, events from web rendering engine 190 may include "Invalidate Rectangle" events. An example of an "Invalidate Rectangle" event is described in U.S. Provisional Patent Application No. 61/052,814, filed May 13, 2008, entitled "Methods and Systems For Rendering in a Browser," which is incorporated herein by reference in its entirety. Such an "Invalidate Rectangle" event may be generated, for example, when content is updated or modified while the tab was a background tab or when a user has carried out a scrolling operation to view a portion of a web page, or other action that requires a new area to be redrawn and invalidates a current displayed region, such as a rectangular region. As an example, an "Invalidate Rectangle" event may include the co-ordinates of a region of content that is to be re-rendered. In an embodiment, not intended to limit the invention, rendering engine process 120A-N may accumulate one or more "Invalidate Rectangle" signals from web rendering engine 190.

If events were received from web rendering engine 190 (step 306), rendering engine process 120A-N renders the bitmap based on the events received (step 308). If no events were received from web rendering engine 190 (step 306), rendering engine process 120A-N may render a bitmap without considering any invalidations from web rendering engine 190 (step 310).

The next section describes rendering of resized content, according to an embodiment of the invention.

4. Rendering of Resized Content

This section describes the operation of system 100 when content associated with browser process 110 is resized. As an example, content associated with browser process 110 may be resized when a user resizes a browsed window or any other content area.

Figure 4:
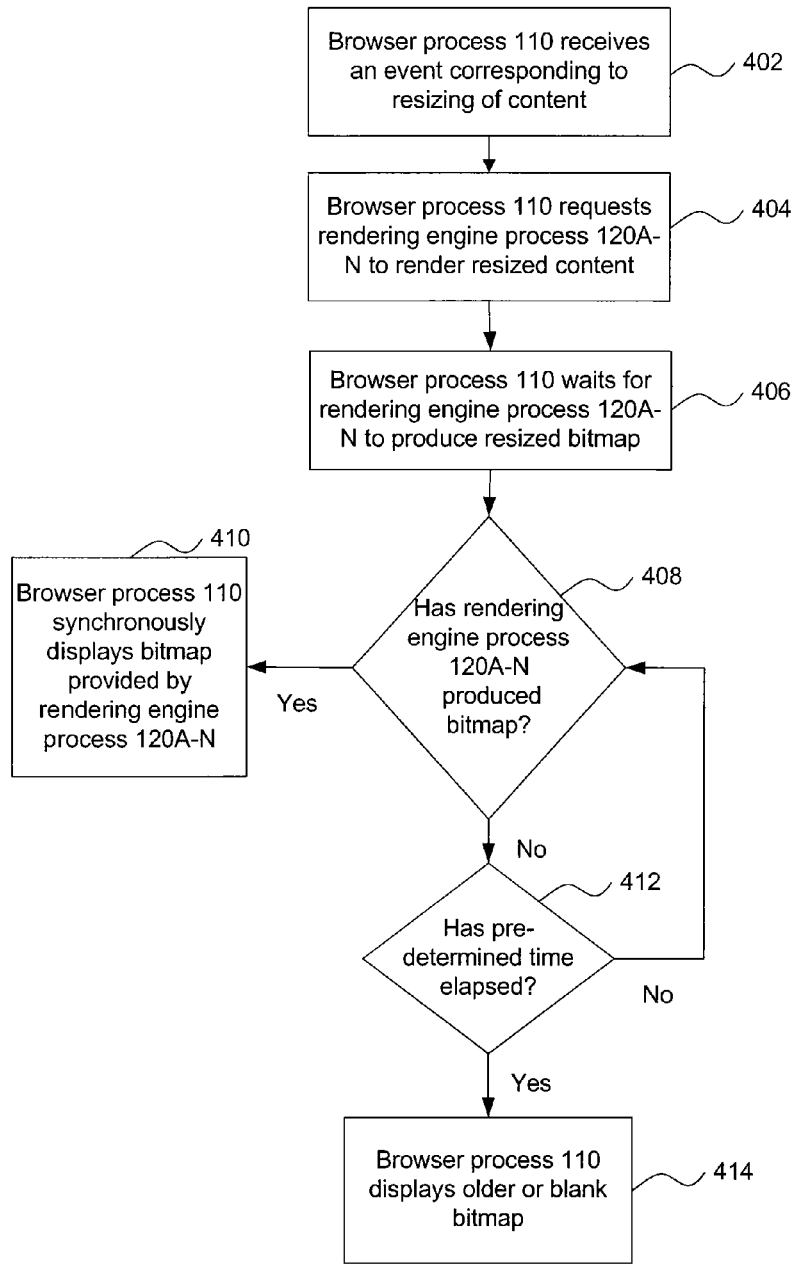
FIG. 4 is a flowchart illustrating rendering of resized content, according to an embodiment of the invention.

FIG. 4 is a flowchart illustrating rendering of resized content, according to an embodiment of the invention.

Method 400 begins with browser process 110 receiving an event corresponding to the resizing of a content area (step 402). As an example, browser process 110 may receive an event when a browser window associated with browser process 110 is resized by a user. When a content area is resized, an updated content area needs to be rendered and displayed as current content will be invalid.

Browser process 110 then sends a request to rendering engine 120A-N to render resized content (step 404).

Browser process 110 then waits for a pre-determined amount of time for rendering engine 120A-N to produce a bitmap (step 406).

Browser process 110 then checks if rendering engine process 120A-N has produced an updated or resized bitmap (step 408). If the rendering engine process has produced an updated or resized bitmap (step 408), browser process 110 displays bitmap produced by rendering engine process 120A-N synchronously with respect to every request to render resized content from browser process 110 (step 410).

If the rendering engine process has not produced an updated or resized bitmap (step 408), browser process 110 checks if a pre-determined time has elapsed (step 412). If the pre-determined time has not elapsed (step 412), method 400 proceeds to step 408, where browser process 110 continues to wait for the rendering engine process 120A-N to produce an updated or resized bitmap until the pre-determined time has elapsed.

If the pre-determined time has elapsed (step 412), browser process 110 may display an older bitmap or a blank bitmap (step 414). Furthermore, if rendering engine process 120A-N produces an updated bitmap even after the pre-determined time has elapsed, the updated bitmap can be displayed asynchronously by browser process 110 to allow a user to view updated content.

As browser process 110 waits for a pre-determined amount of time for rendering engine process 120A-N to produce a bitmap, browser process 110 is able to synchronously display resized and updated content to a user. If browser process 110 did not wait for a pre-determined amount of time and displayed an older bitmap asynchronously, prior to displaying an updated or resized bitmap, a user would initially see older content before is replaced by any updated or resized content, leading to undesirable effects such as flicker. In this way, synchronous display of resized content may reduce flicker and improve user experience.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of resizing a content area in a multi-process browser, comprising:

initiating, in the multi-process browser, a rendering engine process and a browser process;

receiving, at the browser process, a request to resize the content area;

providing the request from the browser process to the rendering engine process;

rendering, at the rendering engine process, an updated bitmap representing a rendered output of a resized content area based on the request;

waiting, at the browser process, to allow the rendering engine process to render the updated bitmap, wherein the waiting to allow the rendering engine process to render the updated bitmap comprises waiting a first predetermined amount of time to allow the rendering engine process to render the updated bitmap;
determining whether the updated bitmap has been produced within the first predetermined amount of time;
determining whether the updated bitmap has been produced within a second predetermined amount of time if the updated bitmap is not produced within the first predetermined amount of time;
displaying, at the browser process, the updated bitmap synchronously with respect to the request if the updated bitmap is produced during the waiting, wherein the displaying the updated bitmap synchronously with respect to the request comprises displaying the updated bitmap synchronously with respect to the request if the updated bitmap is determined to be produced within the first predetermined amount of time, and displaying the updated bitmap synchronously with respect to the request if the updated bitmap is determined to be produced within the second predetermined amount of time; and
displaying the updated bitmap asynchronously with respect to the request if the updated bitmap is produced after the second predetermined amount of time.

2. The method of claim 1, further comprising:
displaying a second bitmap, different from the updated bitmap. if the updated bitmap is not produced by the rendering engine process during the waiting.

3. The method of claim 1, further comprising:
determining that the updated bitmap is not produced during the waiting; and
displaying the updated bitmap asynchronously with respect to the request after a predetermined amount of time has elapsed.

4. The method of claim 1, wherein the displaying the updated bitmap synchronously with respect to the request comprises displaying the updated bitmap synchronously with respect to every received request to resize the content area.

5. The method of claim 1, further comprising:
determining if a cache includes the updated bitmap, the updated bitmap being based on every received request to resize the content area,
wherein the displaying the updated bitmap comprises displaying the cached bitmap if it is determined that the cache includes the updated bitmap.

6. The method of claim 1, wherein the initiating a rendering engine process and a browser process initiates the rendering engine process and the browser process as separate processes.

7. The method of claim 1, wherein the displaying comprises displaying the updated bitmap synchronously after the waiting.

8. The method of claim 2, wherein the second bitmap is an older bitmap relative to the updated bitmap.

9. The method of claim 2, wherein the second bitmap is a blank bitmap.

10. A system for resizing a content area in a multi-process browser architecture comprising:
a rendering engine process configured to generate an updated bitmap of a certain size in response to a request to resize the content area, wherein the updated bitmap represents a rendered output of a resized content area based on the request; and
a browser process configured to:
wait to allow the rendering engine process to generate the updated bitmap, wherein waiting to allow the rendering engine process to generate the updated bitmap comprises waiting a first predetermined amount of time to allow the rendering engine process to generate the updated bitmap;
determine whether the updated bitmap has been generated within the first predetermined amount of time;
synchronously display the updated bitmap with respect to the request if the updated bitmap is generated while the browser process waits to allow the rendering engine process to generate the updated bitmap;
wherein synchronously displaying the updated bitmap with respect to the request comprises synchronously displaying the updated bitmap with respect to the request if the updated bitmap is determined to be generated within the first predetermined amount of time, and synchronously displaying the updated bitmap with respect to the request if the updated bitmap is determined to be generated within the second predetermined amount of time; and
asynchronously display the updated bitmap with respect to the request if the updated bitmap is generated after the second predetermined amount of time,
wherein each of the rendering engine process and the browser process is initiated in the multi-process browser architecture,
each of the rendering engine process and browser process is implemented on a processing device.

11. The system of claim 10, further comprising:
a timer configured to check if the rendering engine process has generated the updated bitmap within a predetermined amount of time.

12. The system of claim 10, further comprising:
a web rendering engine configured to generate one or more requests to the rendering engine process corresponding to changes in content associated with a tab.

13. The system of claim 10, wherein the updated bitmap is a bitmap associated with tab content, and further comprising:
a cache that stores the updated bitmap associated with the tab content.

14. The system of claim 10, wherein the browser process is configured to display the updated bitmap asynchronously with respect to the request after a predetermined amount of time has elapsed.

15. The system of claim 10, further comprising:
a timer configured to check whether the rendering process has generated the updated bitmap within a first predetermined amount of time,
wherein the browser process is configured to wait the first predetermined amount of time to allow the rendering engine process to render the updated bitmap, and is further configured to synchronously display the updated bitmap with respect to the request if the updated bitmap is generated within the first predetermined amount of time.

16. The system of claim 15, wherein
the timer configured to determine whether the updated bitmap is generated within a second predetermined amount of time if the updated bitmap is not generated within the first predetermined amount of time, and
the browser process is configured to synchronously display the updated bitmap with respect to the request if the updated bitmap is generated within the second predetermined amount of time, and is further configured to asynchronously display the updated bitmap with respect to the request if the updated bitmap is generated after the second predetermined amount of time.

17. The system of claim 10, wherein the browser process is configured to synchronously display the updated bitmap with respect to every received request to resize the content area.

18. A non-transitory computer readable storage medium encoded with a computer program, the program comprising instructions that when executed by one or more computers cause the one or more computers to perform operations to:
- initiate, in a multi-process browser, a rendering engine process and a browser process;
- receive, at the browser process, a request to resize a content area;
- provide the request from the browser process to the rendering engine process;
- wait to allow the rendering engine process to render an updated bitmap representing a rendered output of a resized content area based on the request, wherein waiting to allow the rendering engine process to render the updated bitmap comprises waiting a first predetermined amount of time to allow the rendering engine process to render the updated bitmap; and
- determine whether the updated bitmap has been produced within the first predetermined amount of time;
- determine whether the updated bitmap has been produced within a second predetermined amount of time if the updated bitmap is not produced within the first predetermined amount of time;
- display the updated bitmap synchronously with respect to the request if the updated bitmap is produced during the wait to allow the rendering engine process to render the updated bitmap,
- wherein displaying the updated bitmap synchronously with respect to the request comprises displaying the updated bitmap synchronously with respect to the request if the updated bitmap is determined to be produced within the first predetermined amount of time, and displaying the updated bitmap synchronously with respect to the request if the updated bitmap is determined to be produced within the second predetermined amount of time; and
- display the updated bitmap asynchronously with respect to the request if the updated bitmap is produced after the second predetermined amount of time.

19. The non-transitory computer readable storage medium of claim 18, wherein
- the instructions that when executed by one or more computers cause the one or more computers to perform operations to determine whether the updated bitmap has been produced within a first predetermined amount of time,
- the instructions that when executed by one or more computers cause the one or more computers to perform operations to wait to allow the rendering engine process to render an updated bitmap further cause the one or more computers to perform operations to wait the first predetermined amount of time to allow the rendering engine process to render an updated bitmap, and
- the instructions that when executed by one or more computers cause the one or more computers to perform operations to display the updated bitmap synchronously with respect to the request further cause the one or more computers to perform operations to display the updated bitmap synchronously with respect to the request if the updated bitmap is produced within the first predetermined amount of time.

20. The non-transitory computer readable storage medium of claim 19, wherein the instructions that when executed by one or more computers further cause the one or more computers to perform operations to:
- determine whether the updated bitmap is produced within a second predetermined amount of time if the updated bitmap is not produced within the first predetermined amount of time; and
- display the updated bitmap synchronously with respect to the request if the updated bitmap is produced within the second predetermined amount of time; and
- display the updated bitmap asynchronously with respect to the request if the updated bitmap is produced after the second predetermined amount of time.

21. The non-transitory computer readable storage medium of claim 18, wherein the instructions that when executed by one or more computers cause the one or more computers to perform operations to display the updated bitmap synchronously with respect to the request further cause the one or more computers to perform operations to display the updated bitmap synchronously with respect to every received request to resize the content area.

* * * * *